US005118348A

United States Patent [19]

Glavin et al.

[11] Patent Number: 5,118,348

[45] Date of Patent: Jun. 2, 1992

[54] MAGNETIC INK FOR NON IMPACT PRINTING OF DOCUMENTS

[75] Inventors: Robert E. Glavin, Fairport; Michael J. McElligott, Rochester; James T. McCarthy, Honeoye Falls; Terence W. Andrews, Rochester, all of N.Y.

[73] Assignee: Nu-Kote International, Inc., Rochester, N.Y.

[21] Appl. No.: 695,081

[22] Filed: May 3, 1991

Related U.S. Application Data

[62] Division of Ser. No. 315,421, Feb. 24, 1989, Pat. No. 5,041,331.

[51] Int. Cl.[5] ............ C09D 11/02

[52] U.S. Cl. ............ 106/20; 106/23; 106/32; 252/62.54

[58] Field of Search ............ 428/341, 195; 346/74.76; 8/407; 106/20, 23, 32, 476, 477, 460; 252/62.54, 62.56

[56] References Cited

U.S. PATENT DOCUMENTS 4,103,066 7/1978 Brooks et al. ............ 428/337
4,628,000 12/1986 Talvalkar et al. ............ 106/23
4,923,749 5/1990 Talvalkar ............ 428/341
4,944,802 7/1990 Chagnon et al. ............ 106/23

FOREIGN PATENT DOCUMENTS 0145186 6/1989 Japan ............ 428/341

*Primary Examiner*—William R. Dixon, Jr.
*Assistant Examiner*—Helene Klemanski
*Attorney, Agent, or Firm*—Fay, Sharpe, Beall, Fagan, Minnich & McKee

[57] ABSTRACT

The present invention relates to a ribbon for non-impact printing of documents of the type handled by magnetic reader/sorter apparatus comprising a polycarbonate substrate and a magnetic ink layer with a thin film of metal disposed between said substrate and said ink layer. The substrate consists essentially of a polycarbonate polymer containing from about 20 to about 40 percent by weight of an electrically conductive carbon black and the magnetic ink consists essentially of from about 60 to about 80 parts by weight of a solvent comprising at least member selected from the group consisting of aliphatic alcohols having from 1 to about 5 carbon atoms, and aromatic hydrocarbons having from about 6 to about 10 carbon atoms; about 10 to about 30 parts by weight of a polyamide polymer; from about 10 to about 30 parts by weight of a magnetic oxide; from about 1 to about 4 parts by weight of a plasticizer selected from the groups consisting of azelate, phthalate, palmitate and adipate esters, from about 0 to about 10 parts by weight of carbon black and from about 0 to about 5 parts by weight of an alcohol soluble dye.

9 Claims, No Drawings

MAGNETIC INK FOR NON IMPACT PRINTING OF DOCUMENTS

This is a divisional of copending U.S. patent application Ser. No. 07/315,421 filed on Feb. 24, 1989, U.S. Pat. No. 5,041,331.

BACKGROUND OF THE INVENTION

The present invention relates to ribbons for non-impact printing and more particularly to ribbons for non-impact printing of magnetic ink compositions to encode checks and other machine readable documents.

So called "non-impact printing" as a broad concept is now well known in the art. It has become a more and more popular means of printing in typewriters, computer printers and the like because of the elimination of the very high noise associated with impact technologies such as dot matrix and daisy wheel systems. The basic principle of the non-impact printing is the use of heat to melt an ink coating from the ribbon to form an image on a receiver substrate such as paper.

The conventional thermal transfer process employs a thermal printhead which is a resistor, and the ribbon is composed of a substrate of polyester film with a wax ink coating applied to one side. The printhead generates a thermal energy which comes in contact with the polyester. The heat is transmitted from the printhead through the polyester to the wax ink coating which melts to form the image. The thermal printhead must, of course, be cooled down and reheated for each separate image formation.

A more recent non-impact system, often referred to as an electrically resistive heat transfer system differs from the conventional thermal transfer system both in printhead and in ribbon construction. Using this technology, the printhead is not a resistor and does not itself generate heat per se, but rather is composed of a plurality of thin wires or electrodes which pass on electrical current. The heat needed for production of the image is generated within the ribbon itself by the electrical current from the printhead. Thus, the ribbon itself is in effect the resistor and normally comprises three layers, a conductive polymer film which will serve as a resistor with respect to the electric current and thereby generate heat; a thin layer of metal such as aluminum usually applied by vacuum deposition techniques; and the third ink containing meltable polymer based layer which will melt in response to the heat generated in the polymer film, and transfer from the metal layer to the substrate in the form of the desired image. An additional release layer is sometimes employed between the aluminum and the ink layer to further facilitate the transfer of the ink to the substrate.

The electrically resistive heat transfer techniques have a number of significant advantages over so-called conventional thermal transfer techniques. First, they substantially lower the printer costs, since they eliminate the necessity for expensive components to cool and reheat the printhead. Also, they facilitate higher printing speeds since they don't require a conventional resistor thermal printhead which must be cooled down and reheated between images. And, perhaps most important, these new techniques can generate better print quality, since the heat is generated within the ribbon itself and is not dissipated by going through intermediate layers, thereby providing better print quality over a much wider range of papers, films and other substrates.

To date, however, the materials employed in the ink layer of electrically resistive heat transfer ribbons have consisted primarily of pigments such as carbon black and other inorganic materials.

For example, U.S. Pat. No. 4,103,066 discloses a ribbon for non-impact printing which comprises a transfer layer and a substrate. The substrate is a polycarbonate resin containing from about 15 to about 40% electrically conductive carbon black and the transfer coating is made up of wax, carbon black and a dye such as methyl violet dye. U.S. Pat. No. 4,549,824 discloses the use of azo dyes in thermal ink transfer applications, but these dyes facilitate the use of lower temperatures rather than providing erasure proof print characters on the ultimate substrate.

While the inks and ribbons heretofore known are quite satisfactory in typical conventional typing and printing applications of most business offices, they are often unsuited for applications such as the printing of checks, negotiable instruments and other special documents of the type which should, if possible, be erasure proof and which can only be expeditiously handled by sophisticated magnetic reader/sorter equipment. These applications have not heretofore been open to the use of electrically resistive heat transfer techniques, instead requiring much slower and extremely noisy impact printing techniques.

In the so-called typical office applications, the criteria for setting minimum standards of clarity and quality are often largely subjective judgments left to the individual typing or printing the document and, accordingly, a high degree of variation exists. In the printing of documents to be sorted by magnetic reader/sorter equipment, however, the standards are extremely detailed, and critical image standards established by the American Banking Association for magnetic encoded images must be met.

Typical ribbons used today for impact printing of checks, negotiable documents, and the like, generally have an ink coating which is on the order of 65% or more magnetic oxide. Such a loading of magnetic oxide has been considered essential to obtain both visual print quality and the desired level of signal transmission for machine scanning. Yet such loadings are clearly impossible in thermal transfer applications, where the ink layer must melt and transfer to the paper or document substrate, because the melting points of the magnetic oxides are several orders of magnitude higher than the general limit at 150° C. required to avoid melting the electrically resistive polymer substrate.

It is therefore, one object of the present invention to provide a ribbon for non-impact magnetic printing of checks and other documents traditionally handled and processed with the aid of magnetic reader/sorter equipment.

It is another object of the present invention to provide a magnetic ink composition useful in encoding checks and similar documents processed with the aid of magnetic reader/sorter apparatus.

It is yet another object of the present invention to provide a ribbon for non-impact erasure proof printing of checks and other negotiable documents.

SUMMARY OF THE INVENTION

It has now been discovered that it is possible to provide a substantially erasure proof "magnetic transfer ribbon" for use with electrically resistive heat transfer equipment. The ribbon is composed of a electrically resistive polymer layer and a layer containing magnetic ink and erasure proof dye, plus a thin layer of metal disposed between said resistive layer and said ink layer.

In one aspect, the present invention comprises a magnetic ink for non-impact printing of documents which are normally processed using magnetic reader/sorter equipment. The ink consists essentially of from about 60 to about 80 parts by weight of a solvent comprising at least member selected from the group consisting of aliphatic alcohols having from 1 to about 5 carbon atoms, and aromatic hydrocarbons having from about 6 to about 10 carbon atoms; about 10 to about 30 parts by weight of a meltable polymer; from about 10 to about 30 parts by weight of a magnetic oxide; from about 1 to about 4 parts by weight of a plasticizer selected from the group consisting of dioctyl azelate, dioctyl phthalate, dodecyl azelate, diisooctyl azelate, butyl stearate, isopropyl palmitate, and similar esters, fatty acids and the like. The ink may also contain from about 0 to about 10 parts by weight of carbon black and from about 0 to about 5 parts by weight of an alcohol soluble dye.

In another aspect, the present invention comprises a ribbon for non-impact printing of documents of the type handled by magnetic reader/sorter apparatus comprising the above described magnetic ink and a polycarbonate substrate with a thin film of metal disposed between said substrate and said ink layer; said substrate consisting essentially of a polycarbonate polymer containing from about 20 to about 40 percent by weight of an electrically conductive carbon black.

In yet another aspect the present invention comprises ribbon for non-impact erasure proof printing of documents such as checks negotiable instruments and the like comprising a polycarbonate substrate and a meltable ink layer with a thin film of metal disposed between said substrate and said ink layer. The substrate consists essentially of a polycarbonate polymer containing from about 20 to about 40 percent by weight of an electrically conductive carbon black. The meltable ink consists essentially of from about 50 to about 80 parts by weight of a solvent comprising at least member selected from the group consisting of aliphatic alcohols having from 1 to about 5 carbon atoms, and aromatic hydrocarbons having from about 6 to about 10 carbon atoms; about 10 to about 30 parts by weight of a polyamide polymer; from about 10 to about 30 parts by weight of a magnetic oxide; from about 1 to about 4 parts by weight of a plasticizer selected from the group consisting of azelate, phthalate, palmitate and adipate esters; from about 1 to about 10 parts of an alcohol soluble dye, and from about 0 to about 10 parts by weight of carbon black.

PREFERRED EMBODIMENT

In the preferred embodiment of the present invention, the ribbon comprises a polycarbonate polymer substrate having a thickness of from about 10 to about 20 microns, a thin film of aluminum having a thickness of from about 800 to about 1200 angstroms, preferably applied to the polycarbonate substrate by vapor deposition techniques, and an ink layer having a melting point below that of the polycarbonate substrate and a thickness of from about 5 to about 20 microns. The preferred ink composition consists essentially of from about 50 to about 80 parts by weight of a solvent comprising at least one member selected from the group consisting of aliphatic alcohols having from 1 to about 5 carbon atoms, and aromatic hydrocarbons having from about 6 to about 10 carbon atoms; about 10 to about 30 parts by weight of a polyamide polymer; from about 10 to about 30 parts by weights of a magnetic oxide; and from about 1 to about 4 parts by weight of a plasticizer such as dioctyl azelate, dioctyl phthalate, dodecyl azelate, or the like. The ink compositions may optionally contain ½ part by weight or more of carbon black and/or ½ part by weight or more of an alcohol soluble dye.

It will, of course, be appreciated that a wide degree of latitude exits in the selection of specific solvents. The function of the solvent is to provide a substantially uniform viscous mixture which can be screened, rolled or applied by other well known means on to the aluminum coated polycarbonate substrate. The solvent, of course, must be miscible and/or compatible with the other components of the ink, must have a boiling point high enough to assure that there is no undue loss of solvent prior to application of the ink layer to the aluminized polycarbonate ribbon, yet sufficiently low to assure that most of the solvent will be evaporated during fabrication of the ribbon so that the fabricated ribbon will be effectively dry to the touch.

The plasticizer on the other hand may be selected from a wide variety of aromatic and aliphatic oils compatible with the polyamide or other polymer resin being used in compounding the ink. It must have a boiling point higher than the temperature being transmitted through the metal layer to the ink layer. In general, any plasticizer commonly employed with the polymer utilized in the ink composition should prove suitable. The original function of the plasticizer was to improve the flow at the melt point, but it has been very surprisingly found that it also substantially improves print quality and the level of the signal transmission.

The following examples as well serve by way of illustration and not by way of limitation to describe some of the preferred ribbons and ink compositions of the present invention.

EXAMPLE 1

An ink composition was prepared by admixing the following ingredients:

| An ink composition was prepared by admixing the following ingredients: | |
|---|---|
| Isopropyl Alcohol | 49 parts by weight |
| Toluene | 20 parts by weight |
| UNIREZ 1533 Polyamid Resin (Union Camp) | 15.5 parts by weight |
| Hercules B-350 Grade Magnetic oxide | 17.5 parts by weight |
| Carbon Black | 1 part by weight |
| Di-octyl azelate | 4 parts by weight |
| Nigrosine Alcohol Soluble Dye | 1 part by weight |

The ingredients were mixed for 16 hours at 25° C. in ball mill. The magnetic ink composition was applied to the aluminized side of a carrier substrate with a reverse roll coater. The carrier substrate was Mobay Chemical Corporation MAKROFOL KL3-1009, prepared from a polycarbonate film and conductive carbon black, milled in methylene chloride and cast coated on a metal drum; (Caliper, 15 microns +/−5%; Tensile Strength, 9,500–11,000 psi; Elongation, 9%; Surface Resistance, 580–650 ohm sq.; Volume Resistivity, 1 ohm-cm; and a Density of 1.28); which was cast into a substrate film 24 inches wide by 15 microns thick, onto one surface of which a 1000 Å layer of aluminum was applied by conventional vapor deposition techniques.

The assembled ribbon was employed in conjunction with a standard commercial IBM Quietwriter printer (Model 5201) to magnetically imprint a series of test documents. The magnetically imprinted documents were then processed in a Unisys magnetic reader/sorter and a reject rate of less than 1% was observed. These results are highly unexpected in as much as the normal magnetic oxide loading of over 65% has been reduced to about 16% of the total ink composition, and less than 45% of the non volatile portion of the ink.

EXAMPLE 2

Two additional test ribbons were prepared in a manner similar to Example 1, but using the following ink formulations.

| | % Wt. |
|---|---|
| Formula A | |
| Polyamide Resin (Unirez 1533) | 19 |
| Isopropyl Alcohol | 53 |
| Toluene | 23 |
| Carbon Black | 5 |
| Formula B | |
| Polyamide Resin (Unirez 1533) | 19 |
| Isopropyl Alcohol | 53 |
| Toluene | 23 |
| Alcohol Soluble Nigrosine Dye | 5 |

Each of the foregoing formulas was employed to produce a test ribbon which was employed in test printing using Quietwriter equipment as described in Example 1. The documents produced by each of the two ribbons were subjected to erasure testing. The print produced by Formula A was readily mechanically erased with a simple pencil eraser. The print produced from Example B on the other hand could not be completely erased without disruption of the paper fiber which would make it obvious that an erasure had taken place. Further examination of the print produced by Formula B indicated that the dye had been carried into the paper fibers apparently by residual solvent. It will, of course, be obvious that for applications such as those contemplated for the printing ribbons of the present invention, the ability to provide an erasure proof print character is extremely advantageous and desirable.

A series of further tests were conducted to evaluate the optimum loading level for magnetic oxide and optimum plasticizer level. In general, it was found that compositions in which the ratio of polyamide resin to magnetic oxide was in the range of 1:1 tended to produce clearly acceptable results while ratios in the order of 2:1 or more tended to produce marginally acceptable print characteristics at best, unless the coating weight (the thickness of the ink coating on the ribbon) is substantially increased. The use of thicker ink coatings on the ribbon is considered very highly undesirable not only because of the potential extra costs of laying down a thicker coating, but more importantly because the thicker coating could result in a substantially reduced footage of ribbon for a given diameter of spool which is, of course, predefined for a given species of printing equipment.

Attempts to eliminate the use of plasticizer had a highly unexpected effect on print quality and the signal transmission. Plasticizer levels on the order of less than about 6% by weight based on the weight of the polyamide resin tended to have a substantial adverse effect on both print quality and signal transmission such that a heavier coat weight would have to be employed with the disadvantages noted above. Plasticizer levels of about 25% by weight, based on the weight of the polyamide resin, tended to yield acceptable results from the point of view of print quality and signal transmission, however, levels above about 25% tend to increase the possibility that the transferred ink will not be dry to the touch with resultant possibility of smudging. Thus the preferred range of the plasticizer concentration is from about 6% to about 25% based on the weight of the polyamide resin, having in mind that the ratio of resin to magnetic oxide and the specific plasticizer being employed could slightly lower or raise the preferred range of plasticizer concentration.

The present invention also contemplates the use of an optional release layer between the aluminum surface of the ribbon substrate and the ink layer. Experiments were conducted with the materials of Example 1 using a release layer of about 3 microns. Such release layers are prepared by coating the film with a water based dispersion or emulsion of a high molecular weight polyethylene, ethylene interpolymers, ethylene vinyl acetates and acrylic latex, for example, Adcote 37R610 manufactured by Morton Thiokol, an ethylene interpolymer, and Hycar 26120 manufactured by B. F. Goodrich which is an acrylic latex.

Use of a release layer had a clearly beneficial effect in diminishing any slight adhesion of particles of the ink layer to the aluminum layer. While the foregoing types of release layers were found to be specifically effective, such release layers are generally well known in the non-impact ribbon art and it is expected that any of the known release materials should provide results substantially equivalent to those achieved with the materials noted above.

It will be understood that the foregoing is presented by way of illustration and not by limitation and that the wide variety of changes, substitutions can be made in the specific materials processes and equipment hereinbefore described and without departing from the scope of the invention herein disclosed.

As in our invention, we claim:

1. Magnetic ink for non-impact printing of documents which are processed using magnetic reader/sorter equipment consisting essentially of from about 60 to about 80 parts by weight of a solvent comprising at least one member selected from the group consisting of aliphatic alcohols having from 1 to about 5 carbon atoms, and aromatic hydrocarbons having from about 6 to about 10 carbon atoms; about 10 to about 30 parts by weight of a polyamide polymer; from about 10 to about 30 parts by weight of a magnetic oxide; from about 1 to about 4 parts by weight of a plasticizer selected from the group consisting of azelate, phthalate, palmitate and adipate esters; from about 0 to about 10 parts by weight of carbon black and from about 0 to about 5 parts by weight of an alcohol soluble dye.

2. The ink according to claim 1 wherein said ink contains at least from about 5 to about 25% by weight plasticizer based on the weight of the polyamide polymer.

3. The ink according to claim 2 wherein said plasticizer is dioctyl azelate.

4. The ink according to claim 1 wherein said ink has a melting point below 140° C.

5. The ink according to claim 3 wherein said ink has a melting point of below 140° C.

6. The ink according to claim 1 wherein the weight ratio of the polyamide polymer to the magnetic oxide is in the range of from about 4:6 to about 6:4.

7. The ink according to claim 1 wherein said solvent comprises a mixture of isopropyl alcohol and toluene.

8. The ink composition according to claim 7 wherein said alcohol and said toluene are present in a weight ratio in the range of from about 8:3 to about 3:8.

9. The ink composition according to claim 1 wherein said alcohol soluble dye is nigrosine dye and is present in the range of from about 0.5 to about 4 parts by weight.

* * * * *